INVENTOR.
Robert A. Mendelsohn
BY
Harness & Harris
ATTORNEYS.

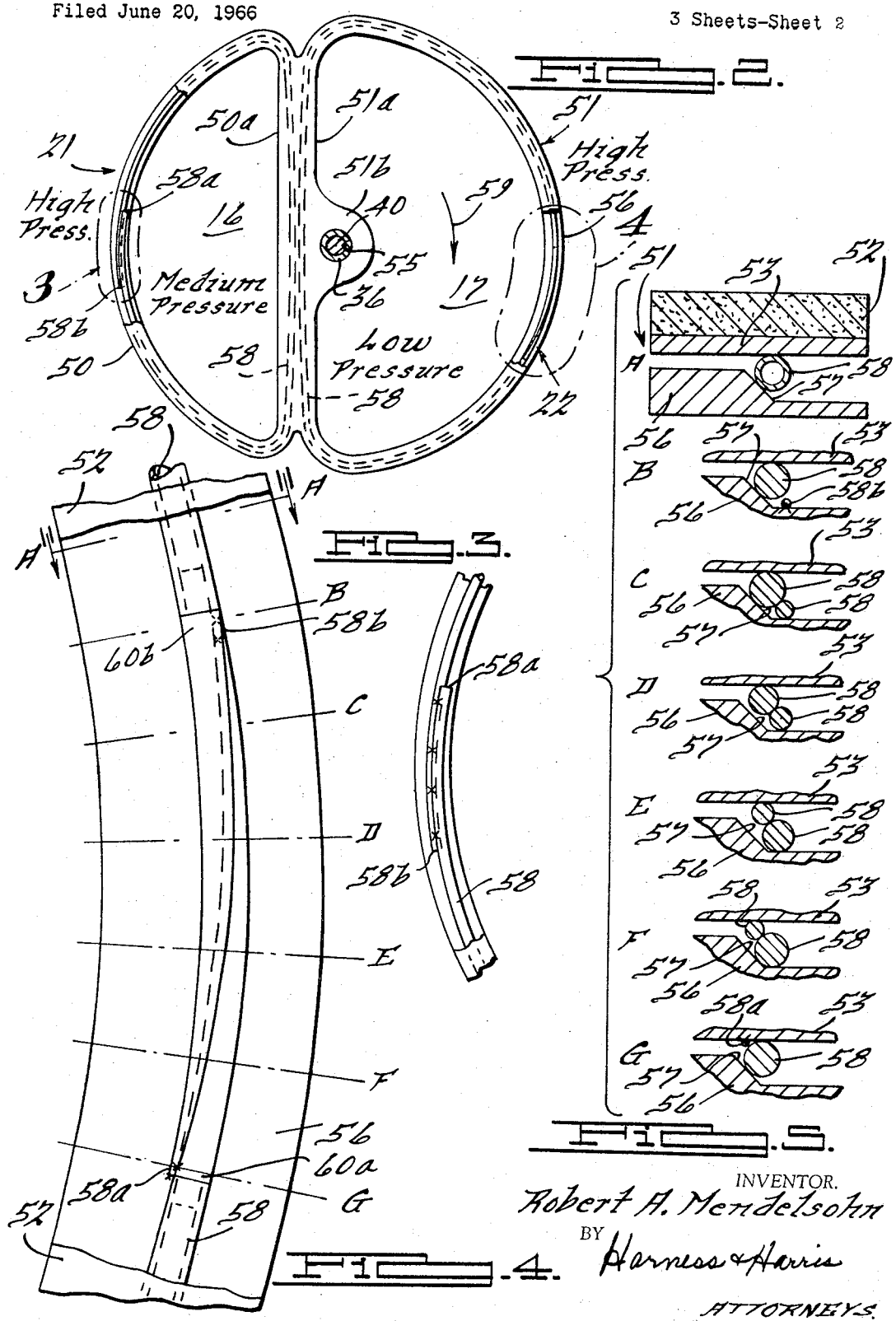

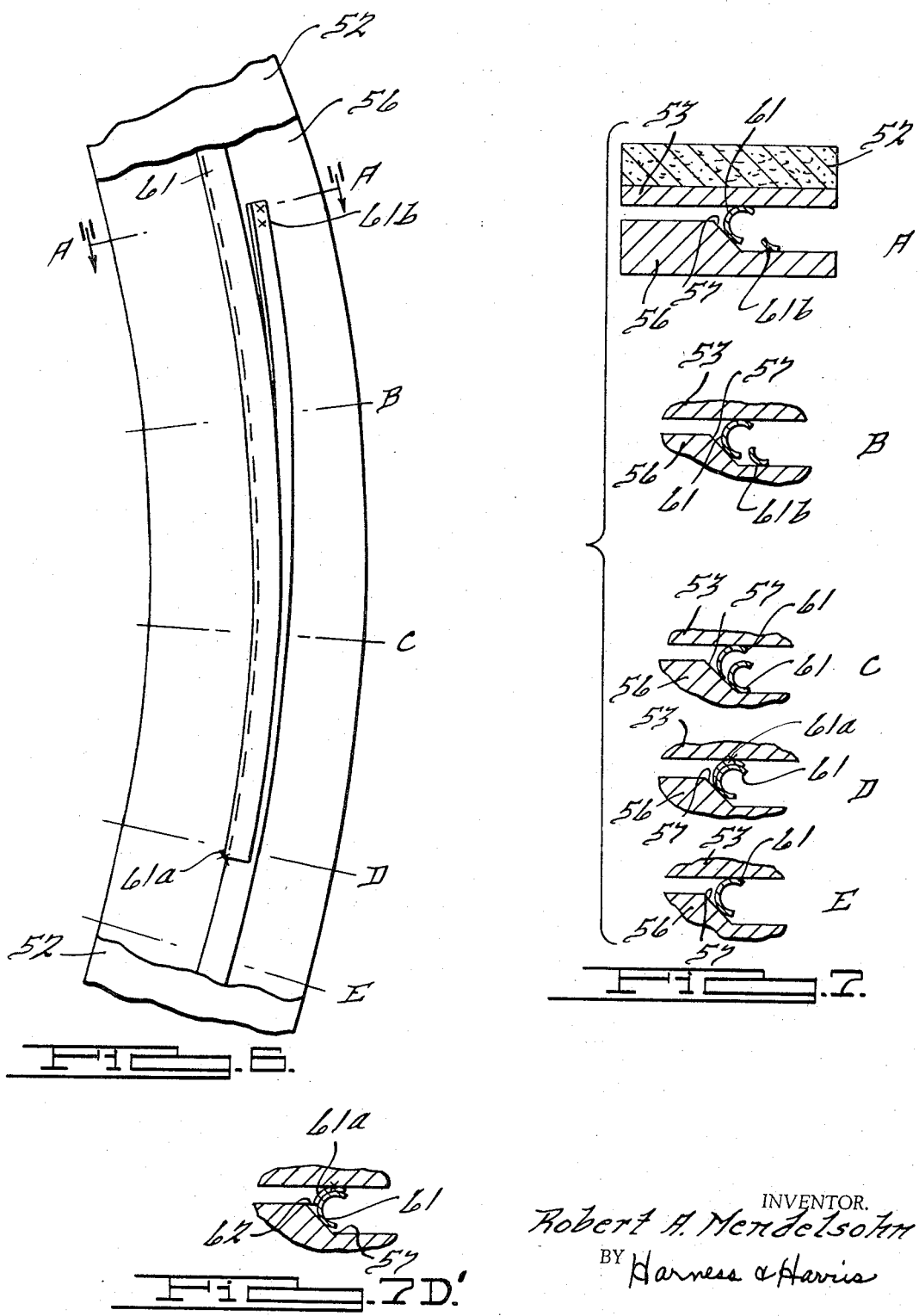

United States Patent Office

3,351,127
Patented Nov. 7, 1967

3,351,127
REGENERATOR SEAL
Robert A. Mendelsohn, Detroit, Mich., assignor to Chrysler Corporation, Highland Park, Mich., a corporation of Delaware
Filed June 20, 1966, Ser. No. 558,956
10 Claims. (Cl. 165—9)

This invention relates to a fluid seal between mating surfaces rotatable with respect to each other and in particular to the sealing of the gas flow passages leading to and from the regenerator of a gas turbine engine, the seal being of the type illustrated in Savonuzzi Patent No. 3,190,351, issued June 23, 1965, and reference is made to that patent for a discussion of some of the sealing problems involved.

In a conventional type of gas turbine engine, the inlet and exhaust motive gases for the turbine rotors are directed by suitable inlet and exhaust conduits respectively to separate sectors of a rotatable regenerator disc. The latter comprises a matrix of small gas passages extending parallel to the axis of rotation, such that heat from the exhaust gases is absorbed by the regenerator matrix and thereafter transferred to the inlet gases as the matrix progressively rotates from the exhaust conduit to the inlet conduit. Because of extreme and constantly varying temperatures to which the regenerator matrix is subjected, warping of the regenerator has rendered difficult the provision of fluid tight seals at the junctures of the matrix with the inlet and exhaust conduits.

An object of the present invention is to provide an improved flexible seal capable of withstanding the temperature extremes involved in a gas turbine engine and of conforming readily to the juncture to be sealed during thermal and pressure induced deformation of the parts at the juncture.

Another object is to provide improved sealing means for use with a rotatable regenerator of a gas turbine engine wherein the sealing means includes a sector plate capable of supporting the regenerator in sliding and sealing engagement therewith and also includes an improved support for the sector plate.

Another object is to provide such a seal characterized by a high degree of flexibility, such that the sector plate may readily flex to conform to the surface contour of the regenerator disc as the latter warps during operation.

One of the problems encountered with many gas turbine regenerator seals known heretofore is that such seals depend at least in part on the pressure differential thereacross for their sealing efficiency. In consequence, difficulty is frequently encountered during starting of the gas turbine engine when the pressure differential across the seal is too slight to assure effective sealing. In such instances, an excessive portion of the air supplied by the conventional compressor, which is electrically operated during starting, bypasses the combustion chamber by leakage through the regenerator seal and is exhausted to atmosphere.

Another object is to provide a seal of the above character which is comparatively economical to fabricate and install and also to replace when worn, yet which provides an effective gas turbine regenerator seal for low pressure operation, as for example during engine starting, as well as an effective seal during normal engine operation.

Another object is to provide such a seal which utilizes the frictional drag between the rotating regenerator and the conventional sector plate to effect low pressure sealing during engine starting, and which utilizes in addition the pressure differential across the seal to enhance its sealing efficiency during normal high pressure operation.

Still another object is to provide an improved seal of the above character which includes a sealing element of circular cross section adapted as a consequence of rotation of the regenerator to be wedged into an opening between a fixed inclined plate of the engine body structure and the usual freely floating regenerator sector plate to seal said opening and urge the sector plate into its sealing engagement with the regenerator, the sealing element by virtue of its circular cross sectional shape being capable of twisting about its longitudinal axis without affecting the angle of its surface contact with said plates and being also capable of filling said opening to seal the same regardless of the latter's constantly changing dimensions effected by regenerator warping.

Other objects of this invention will appear in the following description and appended claims, reference being had to the accompanying drawings forming a part of this specification wherein like reference characters designate corresponding parts in the several views.

FIGURE 2 is an elevational view of the lower sector plate illustrated in FIGURE 1, with portions removed to show details of the seal.

FIGURE 3 is an enlarged fragmentary elevational view of the right hand sealing element of FIGS. 1 and 2, shown in place with the sector plate, a portion of the latter being broken away.

FIGURE 4 is a series of enlarged sectional views taken along the lines A, B, C, D, E, F and G of FIGURE 3, showing details of a modified construction for the ends of the sealing element.

FIGURE 5 is an enlarged fragmentary view showing the overlapping ends within the dotted enclosure 5 of FIGURE 2.

FIGURES 6 and 7 are views similar to FIGURES 3 and 4 respectively, showing another modification, the views 6A, B, C, D and E being taken along the section lines A, B, C, D and E respectively.

Figure 1:
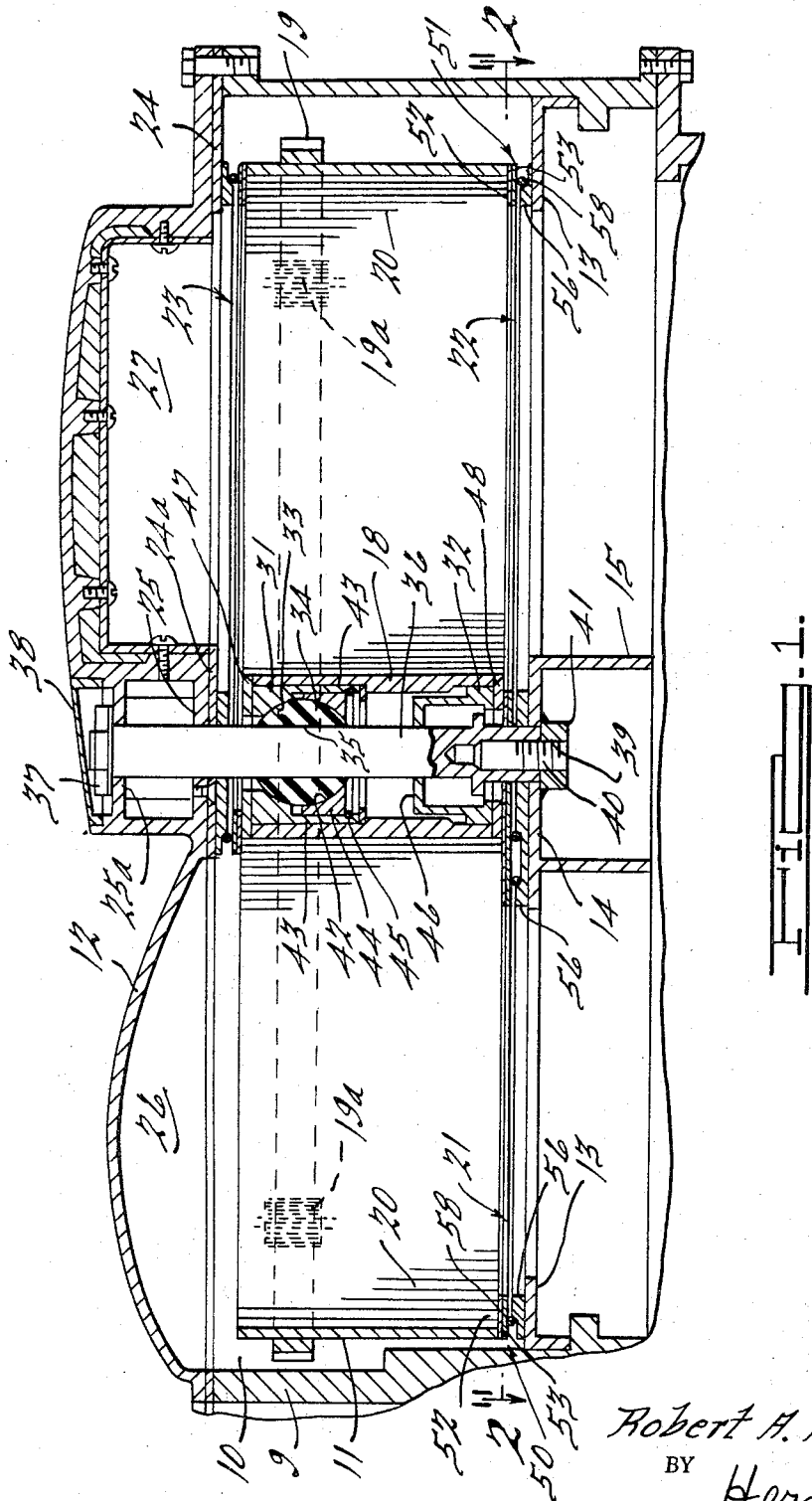
FIGURE 1 is a mid-sectional view through the axis of rotation of a gas turbine regenerator and seal embodying the present invention.

FIGURE 7D′ is a view similar to FIG. 7D, showing another modification.

It is to be understood that the invention is not limited in its application to the details of construcion and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring to the drawing, a particular embodiment of the present invention is illustrated by way of example in application with a gas turbine engine comprising a frame or housing 9 formed to provide a cylindrical chamber 10 for a rotatable regenerator 11. The chamber 10 is closed by a suitable cover 12.

The base of the chamber 10 is defined by a platform 13 comprising an annular part secured to the inner cylindrical wall of the chamber 10 and partitioned into two separate sector areas 16 and 17, FIG. 2, by a diametrically extending cross arm 14 supported by a bulkhead 15 which separates the inlet and exhaust gases flowing through the regenerator as described below.

The regenerator 11 is formed with a central hub 18 and is suitably supported within the chamber 10 for rotation about the axis of the hub 18 which extends perpendicularly to the plane of the platform 13. Secured to the outer periphery of the regenerator 11 is a ring gear 19 which is suitably driven by a pinion gear, not shown, operably connected with one of the turbine rotors. The regenerator 11 is maintained in centered position with respect to the platform 13 by means of a plurality of idler gears suitably supported by the housing 9 so as to mesh with the gear 19 at locations spaced around its periphery. The body of the regenerator comprises a matrix 20 of a multitude of axially extending gas flow passages arranged to conduct inlet and exhaust gases axially through separate sectors of the regenerator overlying the sectors 16 and 17.

The weight of the regenerator 11 is supported by seals 21 and 22 each comprising closed loops extending completely around the sectors 16 and 17 respectively. Above the regenerator 11 is an upper seal 23 which is substantially a mirror image of seal 22. The seal 23 is confined between the regenerator 11 and an upper substantially semi-circular or D-shaped seal backup plate 24 enclosing an area substantially coextensive with the sector 17 and suitably secured to the housing 10. The central diametrical portion 24a of plate 24 is supported by a diametrically extending web 25 of cover 12 which partitions the area under the cover 12 into an inlet dome 26 for comparatively cool high pressure gases and an exhaust dome 27 for comparatively hot low pressure exhaust gases.

In accordance with the structure described, combustion supporting inlet air is supplied to dome 26 and the annular space of chamber 10 around regenerator 11 so as to bathe the latter and the driving ring gear 19 in a comparatively cool fluid medium. From dome 26, the inlet gases pass axially downward through the sector of the regenerator 11 overlying sector area 16. Fuel is then added to these gases and burned and the combustion products are employed to drive the gas turbine rotors in accordance with customary practice. The exhaust gases are then conveyed to the underside of the regenerator 11 below the sector 17, thence axially upward through the regenerator matrix into the exhaust dome 27, which latter is connected to atmosphere.

During the downward passage of the inlet gases through the sector 16, these gases absorb heat from the regenerator and also suffer a pressure loss in consequence of the resistance to flow through the regenerator matrix. Accordingly, the gases immediately below the regenerator 11 in the region of the sector 16 are at a pressure somewhat below and at a temperature appreciably above the pressure and temperature of the inlet gases in the chamber 10 surrounding the regenerator 11. The exhaust gases below the regenerator 11 at the region of the sector 17 will be at an appreciably reduced pressure with respect to the pressure of the gases that have passed through the regenerator matrix at the region of the sector 16. However, these exhaust gases are still at high temperature and are thus employed to heat the regenerator matrix during their upward flow therethrough into the exhaust dome 27. In order to maintain the above described flow path, the seals 21 and 22 are designed as described below to prevent flow of the inlet gases into the sectors 16 and 17 from the surrounding portions of the chamber 10. Similarly, the seal 23 is designed to prevent flow of the gases from chamber 10 into the area of the exhaust dome 27.

In the present instance, the regenerator hub 18 is reinforced at its upper and lower ends by cylindrical inserts 31 and 32 respectively, which have upper and lower surfaces substantially flush with the upper and lower ends respectively of the hub 18. The insert 31 is firmly secured within hub 18 to comprise a unitary structure therewith and has a thickened upper part formed with a spherical inner surface 33 in bearing engagement with the concentric spherical outer bearing surface of a ball element 34. The latter is provided with an axial bore 35 centered with respect to the outer surface of ball 34 and comprising a cylindrical bearing surface rotatably and axially slidable on a coaxial vertical supporting shaft 36. The shaft 36 extends upward through the ball 34 and regenerator hub 18 and is secured by means of a nut 37 to an upper platform 25a of cover 12 and is recessed thereinto and covered by a suitable protective shield 38.

The lower end of shaft 36 projects beyond the lower end of the regenerator hub 18 and is provided with a threaded bore 39 having an upwardly extending stud 40 screwed therein. The latter in turn is secured within a nut 41 welded to the base of the housing cross arm 14.

Below the spherical surface 33, the insert 31 comprises an annular cylindrical extension 43 which receives an annular support 44 held in position by means of a snap ring 45 partially embedded into the lower end of extension 43 immediately below support 44. The latter is also provided with an interior spherical surface concentric with the surface of ball element 34 and cooperating with surface 33 to complete a universal type bearing engagement with the ball element 34. The interior bores of insert 31 and support 44 are appreciably larger than the diameter of shaft 36 to enable freedom of tilting or cocking of the regenerator matrix 11 about all axes perpendicular to the axis of shaft 36.

The lower insert 32 has upright cylindrical walls terminating in an upper inbent annular flange 46 to provide rigidity for the insert 32. The inner circumferential portions of the inserts 31 and 32 and also of the end closures 47 and 48 of hub 18 are spaced adequately from shaft 36 so that the regenerator matrix 11 has in effect a freely floating mounting with respect to the shaft 36. The outer spherical surface of ball element 34 and its inner cylindrical surface 35 comprise suitable dry bearing surfaces such as graphite or a metallic oxide to enable both rotational and axial movement of the regenerator matrix 11, as well as the aforesaid tilting or cocking movement with respect to the shaft 36. The structure described thus far may be conventional and reference is hereby made to Chute Patent No. 3,192,998, issued July 6, 1965, for further details of the regenerator mounting and of a type of gas turbine engine for which the present invention is adapted.

Referring more particularly to FIGURES 2-4, the seals 21 and 22 comprise D-shaped or part-circular sector or sealing plates 50 and 51 which extend entirely around the associated sector openings 16 and 17 respectively to enable passage of the gases therethrough. The cross sections of the seals 21 and 22 and of the seals 22 and 23 are approximately mirror images of each other, so that only one of these seals is described, the corresponding parts of the seals being numbered the same. The seals may be formed separately and located at opposite sides of the regenerator axial shaft 36, or the generally diametrical cross arm portions of the separate seals may be joined and may extend on one side of shaft 36, as illustrated in FIGS. 1 and 2.

Each of the sector plates 50 and 51 preferably comprises a flexible rubbing seal or layer 52 of suitable material such as graphite or a metallic oxide for example, depending upon the temperatures involved, in sliding and sealing engagement with the adjacent axial end surface of the regerenator disc or matrix 11. The sealing material 52 is bonded to an underlying and coextensive backing plate 53 which in the present instance may comprise stainless steel sufficiently thin to be freely flexible and thereby readily adaptable to conform closely to the contour of the regenerator surface engaged by the rubbing seal 52 as the regenerator 11 warps during operation.

As illustrated in FIGURE 2, the sector plates 50 and 51 extend circumferentially around the peripheral portions of the sectors 16 and 17 respectively at the peripheral portions of the overlying regenerator 11. The sector plates 50 and 51 have diametrical portions 50a and 51a respectively to complete separate seals entirely around each of the sectors 16 and 77. In the present instance, the juxtaposed rubbing seals 52 of the plates 50 and 51 are joined along the extent of the diametrical or cross arm portions 50a and 51a, FIGURES 1 and 2, and the backup plates 53 of the sector plates 50 and 51 are similarly joined together. The central cross arm portion 51a enlarges at 51b to provide a locating hub having a central hole 55 for shaft 36 and coaxial with the peripheral portions of plates 50 and 51.

Underlying and spaced from plates 50 and 51 and also coextensive therewith are fixed plates 56 secured to the housing flange 13, 14. The inner portion of each plate 56 with respect to the associated sector area 16 or 17 is comparatively thick and is joined with an integral thinner outer portion by means of an inclined surface 57, FIGURE 4A. The fixed plates 56 comprise portions of the seals 21 and 22 and may be of comparatively rigid stainless steel.

A separate flexible sealing element comprising in the present instance a wire 58 of circular cross section, which may be tubular as in FIGS. 3 and 4 or solid as in FIG. 5, extends entirely around each sector 16 and 17 and is wedged into the space between the inclined surface 57 and the overlying surface of plate 53 to complete a fluid-tight seal therebetween. The wire 58 may comprise any suitable flexible sealing material, depending upon the temperatures involved. In FIGS. 3 and 4, the wire 58 comprises a stainless steel tube, which for use with a gas turbine regenerator of approximately 18″ diameter would have an outer diameter of approximately .2″. The end portions of the wire 58 overlap each other and may, if desired, have the same diameter as the main body of the wire 58, as indicated by the solid stainless steel wire 58 in conjunction with seal 21. FIGURE 5, particularly if the pressure differential across the seal is nominal and leakage is not a significant problem. In any event the tubular bore is preferably plugged at the ends 58a and 58b. The end 58a extends in the direction of rotation of the regenerator, indicated by the arrow 59, and is secured as by welding to the adjacent surface of the backup plate 53, whereas the opposite end 58b is similarly secured to the rigid plate 56.

Where an appreciable pressure differential exists across the seal or where leakage is a significant problem, the end portions of the wire 58 are defined by solid plugs 60a and 60b which are secured within and close opposite ends of the bore of the wire 58 and may taper as illustrated in FIGURES 3 and 4 to pointed terminals 58a and 58b. Similarly to the structure of the seal shown around sector 16, the terminal 58a of the tapered plug 60a extends in the direction of rotation 69 and is welded to the underside of plate 53. From the extremity 58a, the tapered plug or end portion 60a enlarges in the direction counter to rotation, from bottom to top in FIGURE 4, and is arranged with one edge extending along and in sealing engagement with the plate 53. The maximum diameter of the tapered plug 60a equals the diameter of wire 58 and is attained adjacent or slightly in advance of the opposite terminal 58b of tapered plug 60b. Thus the latter overlaps a maximum diameter portion of the wire 58 and gradually enlarges in the direction of rotation to a maximum diameter equal to the diameter of wire 58 adjacent or slightly in advance of the end 58a, FIGURE 4G. The tapered plug 60b lies in sealing engagement with the fixed plate 56 and also extends for the major portion of its length in side-by-side sealing engagement with the oppositely tapered plug 60a, so as to completely fill the opening between the plates 53 and 56 throughout substantially the entire extent of the overlap.

In accordance with the construction shown, as the plate 51 tends to be rotated in consequence of frictional drag induced by the rotating regenerator 11, the plate 53 will carry the wire end 58a in the direction of rotation, thereby to increase the overlap of the wire end portions and draw the wire 58 tightly in a wedge action along the inclined surface 57 so as to complete an efficient seal between the plates 53 and 56 regardless of the pressure differential thereacross. There may be slight leakage around the ends of the sealing wire 58, but the total leakage can be rendered insignificant by suitably lengthening and contouring the overlap.

For a regenerator as shown having a diameter amounting to approximately 18″, an effective seal is accomplished if the wire ends taper for about 1″. When the regenerator is not rotating, the wire 58 will closely fill the opening between the confronting surfaces of plates 53 and 56, so that in the usual instance, only a small fraction of an inch of travel of end 58a with respect to end 58b will take place when the regenerator is operating. In this regard, in order to distribute the load in the wire 58 around the bends at the opposite ends of the diametric portions of the seal, the curvature at these bends is comparatively large and the overlap at the ends of the wire 58 is preferably near the diametrical line symmetry of the seal illustrated in FIGURE 2. Thus the overlap will be at the circumferential portion of the seal where relative rotation between the plate 53 and fixed plate 56 is urged by the frictional drag of the regenerator 11 on the rubbing seal 52.

In order to facilitate sealing, the curvature of the seal is positive around each area 16 and 17. That is, the inner periphery of each seal with respect to its associated area will preferably be concave entirely around that area. Thus each line element of the inclined surface 57 lying in a plane parallel to the surface of plate 53 comprises a closed loop that is preferably concave entirely around the loop, as viewed from within the area enclosed by the loop, so that no tangent to the loop will intersect the enclosed area. In the limiting case, the seal may lie in a straight line along part of the diametrical portions 50a and 51a.

It is apparent that as the regenerator 11 warps during operation and the sector plates 50, 51 consequently flex to conform to the axial end surface of the regenerator disc, the space between the plates 53 and 56 will vary. The wire 58 will move correspondingly along the inclined surface 57 to complete the seal. Also, since the inclined surface 57 converges toward plate 53 in the direction from high pressure to low pressure across the seal, during high pressure operation of the engine, the high pressure differential across the seal will also assist the sealing action by wedging the wire 58 in the direction along the surface 57 of decreasing separation between the plates 53 and 56.

Also, by virtue of the circular cross section of the wire 58, the latter is free to twist about its longitudinal axis and maintain its sealing contact with plate 53 and surface 57 and with the juxtaposed overlapping wire end portion when subject to torsional forces in consequence of its movement along the inclined surface 57.

FIGS. 6 and 7 illustrate a modification of the sealing element wherein the tubular wire 58 is replaced by a similar wire 61 of circular C-shaped cross section having terminals 61a and 61b corresponding to the terminals 58a and 58b and welded to the plates 53 and 56 respectively. The sealing element 61 is in sliding and sealing engagement with both plates 53 and 56 and tapers to a crescent end 61a having convex and concave surfaces, the radii of both equal to the radius of the outer convex surface of seal 61, as seen in the sectional views, FIG. 6.

When the regenerator 11 is rotating, its frictional drag on sector plate 51 rotates the latter until an overlapping portion of sealing element 61 seats within the concave surface of end 61a, FIG. 6D. From end 61a, the C-shaped overlapping opposite end portion of seal 61 extends unchanged for a short distance to assure adequate sealing overlap, then tapers endwise to end 61b as it recedes from both plate 53 and the overlapping portion of seal 61.

Inasmuch as the end 61a is welded to plate 53 and also engages plate 56, warping of the regenerator 11 adjacent the weld for end 61a is accommodated by resilient flexing of the seal end 61a engaged with surface 57, or the axle hole 55 may be slightly oversize with respect to shaft 36. If desired, a slight clearance 62 may be provided between seal end 61a and the inclined surface 57, FIG. 7D′, whereby the seal between plates 53 and 56 is completed by the overlapping opposite end portion of the seal 61 seated against the inclined surface 57 and also within the concavity of end portion 61a in sliding sealing engagement.

By the foregoing, a simple and economical seal is achieved which is effective either during low pressure starting of the engine or during high pressure operation after the engine is started. The wire 58, being attached only to the plate 53 at a small region at the end 58a or 61a does not interfere with complete freedom of flexing of the sector plate 51 to conform closely to the contour of the constantly warping regenerator.

I claim:

1. In a seal, first and second sealing plates having spaced coextensive surfaces confronting each other and extending around the periphery of a predetermined area, the surface of the first plate confronting the second plate having an inclined portion converging toward the second plate in the direction into said area from said periphery, means adapted to be wedged into the space between said inclined surface portion and the confronting surface of said second plate comprising a flexible sealing element extending from one end thereof in said space around said periphery and terminating at its opposite end adjacent said one end, means for securing each of said ends of said sealing element to one of each of said plates, and means for pulling said ends in opposite directions relative to each other to constrict said element around said periphery in a wedge action between said inclined surface portion and the confronting surface of said second plate to effect a seal between the latter two surfaces comprising means for effecting relative peripheral movement of one of said plates with respect to the other at the region adjacent said ends and in the direction of extension of the end of the sealing element secured to said one plate.

2. In the combination according to claim 1, the surface portions of said sealing element engaging the confronting surfaces of said two plates being of circular cross section transverse to said periphery to enable sealing engagement between said element and confronting surfaces along the length of said element regardless of limited twisting of said element longitudinally thereof.

3. In the combination according to claim 1, said inclined surface portion of said first plate being defined by contour lines extending around said periphery in closed loops, the countour line defining each loop being at a constant distance from the confronting surface of said second plate, and any tangent to one of said contour lines lying outside of the loop defined by that line.

4. In the combination according to claim 1, the end portions of said sealing element overlapping each other in sliding sealing engagement and being contoured to interfit with each other and with said confronting surfaces within said space to effect said seal therebetween, one of said end portions gradually receding from the plate to which it is not secured as it extends endwise in the direction of said overlap, the end of the opposite end portion being of reduced cross section with respect to the cross section of the adjacent overlapping portion of said sealing element and gradually enlarging in cross section to adjacent the end of the last named one end portion.

5. In the combination according to claim 4, the surface portions of said sealing element engaging said confronting surfaces being arcuate about a common radius, the end of the last named opposite end portion which gradually enlarges in cross section to adjacent the end of the last named one end portion being a crescent defined by concave and convex surfaces having radii equal to said common radius, the said convex surface being in said sliding sealing engagement with said confronting surfaces, and said concave surface being in said sliding sealing engagement with the surface of the overlapping portion of said sealing element, the last named surface being a continuation of the arcuate surface portions having said common radius and being seated within said concave surface in said sliding and sealing engagement.

6. In the combination according to claim 4, said overlapping end portions being tapered endwise and the two overlapping tapered surfaces mutually engaging each other in said sliding sealing engagement along a common incline, and each of said end portions also extending in said sliding sealing engagement along the surface of the plate to which it is secured.

7. In the combination according to claim 1, a gas turbine engine having a supporting frame, a regenerator rotatably mounted on said supporting frame and having means for passage of comparatively high and low pressure gases therethrough, partitioning means carried by said frame for separating said high and low pressure gases, said partitioning means including said first and and second sealing plates and said sealing element, the surface of said second sealing plate opposite the surface thereof which confronts said inclined surface portion being in sliding and sealing engagement with a rotating surface of said regenerator, the last named engagement urging said second sealing plate in the direction of rotation of said regenerator and comprising said means for effecting said relative peripheral movement, said sealing element extending in said direction of rotation toward its end secured to said second sealing plate.

8. In the combination according to claim 7, said regenerator comprising a disc-type regenerator rotatable about a central axis and having axially opposed end surfaces for passage of said gases axially therethrough, said area comprising part of one of said regenerator end surfaces bounded by a peripheral portion thereof and a chord joining the ends of said peripheral portion, a gas turbine engine having a supporting frame, a regenerator rotatably mounted on said supporting frame and having means for passage of comparatively high and low pressure gases therethrough, partitioning means carried by said frame for separating said high and low pressure gases, said partitioning means including said first and second sealing plates and said sealing element, the surface of said second sealing plate opposite the surface thereof which confront said inclined surface portion being in sliding and sealing engagement with a rotating surface of said regenerator, the last named engagement urging said second sealing plate in the direction of rotation of said regenerator and comprising said means for effecting said relative peripheral movement, said sealing element extending in said direction of rotation toward its end secured to said second sealing plate.

9. In the combination according to claim 8, the surface portions of said sealing element engaging said confronting surfaces being arcuate about a common radius, the end of the last named opposite end portion which gradually enlarges in cross section to adjacent the end of the last named one end portion being a crescent defined by concave and convex surfaces having radii equal to said common radius, the said convex surface being in said sliding sealing engagement with said confronting surfaces, and said concave surface being in said sliding sealing engagement with the surface of the overlapping portion of said sealing element, the last named surface being a continuation of the arcuate surface portions having said common radius and being seated within said concave surface in said sliding and sealing engagement.

10. In the combination according to claim 8, said overlapping end portions being tapered endwise and the two overlapping tapered surfaces mutually engaging each other in said sliding sealing engagement along a common incline, and each of said end portions also extending in said sliding sealing engagement along the surface of the plate to which it is secured.

References Cited

UNITED STATES PATENTS

| | | | |
|---|---|---|---|
| 3,116,785 | 1/1964 | Bubniak et al. | 165—9 |
| 3,157,226 | 11/1964 | Atwood | 165—9 |
| 3,192,998 | 7/1965 | Chute | 165—9 |
| 3,262,707 | 7/1966 | Williams | 165—9 X |

CARLTON R. CROYLE, *Primray Examiner.*

UNITED STATES PATENT OFFICE
CERTIFICATE OF CORRECTION

Patent No. 3,351,127 November 7, 1967

Robert A. Mendelsohn

It is certified that error appears in the above identified patent and that said Letters Patent are hereby corrected as shown below:

Column 4, line 66, "77" should read -- 17 --. Column 5, line 40, "69" should read -- 59 --.

Signed and sealed this 3rd day of March 1970.

(SEAL)

Attest:

Edward M. Fletcher, Jr.

Attesting Officer

WILLIAM E. SCHUYLER, JR.

Commissioner of Patents